(12) United States Patent
Goulier

(10) Patent No.: US 10,978,910 B2
(45) Date of Patent: Apr. 13, 2021

(54) REMOTELY POWERED CONTACTLESS CARD

(71) Applicant: STMicroelectronics SA, Montrouge (FR)

(72) Inventor: Julien Goulier, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 50 days.

(21) Appl. No.: 16/545,664

(22) Filed: Aug. 20, 2019

(65) Prior Publication Data

US 2019/0372393 A1 Dec. 5, 2019

Related U.S. Application Data

(62) Division of application No. 15/041,181, filed on Feb. 11, 2016, now Pat. No. 10,432,023.

(30) Foreign Application Priority Data

Jul. 3, 2015 (FR) ...................................... 1556345

(51) Int. Cl.
  *H02J 50/10* (2016.01)
  *H02J 50/20* (2016.01)
  *H02J 50/80* (2016.01)

(52) U.S. Cl.
  CPC .............. *H02J 50/10* (2016.02); *H02J 50/20* (2016.02); *H02J 50/80* (2016.02)

(58) Field of Classification Search
  CPC .............. H02J 50/10; H02J 50/80; H02J 50/20
  See application file for complete search history.

(56) References Cited

U.S. PATENT DOCUMENTS

| | | | | |
|---|---|---|---|---|
| 7,738,272 B2 * | 6/2010 | Klapf | ............... | G06K 19/07749 363/67 |
| 8,780,596 B2 * | 7/2014 | Song | .................. | G06K 19/0701 363/125 |
| 8,891,270 B2 * | 11/2014 | Song | ....................... | H02M 7/06 363/125 |
| 10,432,023 B2 * | 10/2019 | Goulier | .................. | H02J 50/20 |
| 2006/0022041 A1 | 2/2006 | Nakane et al. | | |

(Continued)

FOREIGN PATENT DOCUMENTS

| | | |
|---|---|---|
| CN | 1234584 A | 11/1999 |
| CN | 1886879 A | 12/2006 |

(Continued)

OTHER PUBLICATIONS

First Office Action and Search Report for co-pending CN Appl. No. 201610101987.5 dated Jul. 19, 2018 (7 pages).

(Continued)

*Primary Examiner* — Jared Fureman
*Assistant Examiner* — Duc M Pham
(74) *Attorney, Agent, or Firm* — Crowe & Dunlevy

(57) ABSTRACT

A contactless card is powered by an antenna connected to the input of a rectifier. An output of the rectifier is coupled to a processing unit that consumes a first current output from the rectifier. A current regulation circuit is connected to the output of the rectifier. The current regulation circuit operates to absorb a second current from the output of the rectifier such that a sum of the first and second currents is a constant current.

16 Claims, 3 Drawing Sheets

(56) References Cited

U.S. PATENT DOCUMENTS

2008/0191676 A1  8/2008  Ritschel
2015/0061389 A1  3/2015  Song et al.

FOREIGN PATENT DOCUMENTS

CN   101248993 A   8/2008
CN   103326669 A   9/2013
EP     1248175 A2  10/2002

OTHER PUBLICATIONS

Third Office Action and Search Report for co-pending CN Appl. No. 201610101987.5 dated Jul. 25, 2019 (6 pages).

INPI Search Report and Written Opinion for FR 1556345 dated Apr. 28, 2016 (7 pages).

\* cited by examiner

REMOTELY POWERED CONTACTLESS CARD

CROSS REFERENCE TO RELATED APPLICATIONS

This application is a divisional of United States Application for patent Ser. No. 15/041,181 filed Feb. 11, 2016, which claims the priority benefit of French Application for Patent No. 1556345, filed on Jul. 3, 2015, the contents of which are hereby incorporated by reference in their entireties to the maximum extent allowable by law.

TECHNICAL FIELD

The present disclosure relates to remotely powered contactless cards, that is, cards intended to exchange data with a terminal from which they draw their power supply.

BACKGROUND

FIG. 1A shows a remotely powered contactless card 1 arranged in the vicinity of a terminal 3. Terminal 3 comprises an antenna 5 and an electronic circuit 7. Contactless card 1 comprises an antenna 9 connected to a data processing unit 11, via rectifier 13. Unit 11 and the rectifier are connected to a ground of the card.

The terminal permanently emits a field. Thus, when the card is close to the terminal, it is powered by antenna 9 and is capable of receiving a signal 15 and of transmitting a signal 17.

FIG. 1B shows, as a function of time, signal 15 transmitted by antenna 5 of the terminal. FIG. 1C shows signal 17 transmitted by antenna 9 of the card. Four phases can be distinguished.

During an initial phase P0, the card receives from the terminal power which enables to activate processing unit 11. The presence of the card is sensed by the terminal. The terminal then combines, during a phase P1 of reception by the card, a data signal to the power supply field that it emits, and the data are received by antenna 9 of the card and transmitted to unit 11. Unit 11 then processes the data during a data processing phase P2 to prepare the response. The response is sent by the card to the terminal during a phase P3.

To send the response, unit 11 varies current I that it consumes. Current variations 23 in antenna 9 are then detected by the terminal.

A problem is that, during data processing phase P2, current I consumed by unit 11 varies over time, due to the data processing. This causes a variation 25 of the current in antenna 9. Such a variation may be incorrectly interpreted by the terminal as a response of the card, which would result in an error.

SUMMARY

Thus, an embodiment provides a contactless card configured to be powered by an antenna connected to the input of a rectifier having its output coupled to a processing unit which may consume a first current, the contactless card comprising a current regulation circuit also connected to the output of the rectifier, capable of absorbing a second current such that the sum of the first and second currents is a constant current.

According to an embodiment, the constant current is set by a current source.

According to an embodiment, the contactless card comprises a first current mirror which creates a third current equal to the first current divided by a constant, K2; a second current mirror having a first branch receiving the third current and having a second branch coupled to a node coupled to the current source; and a third current mirror having a first branch coupled to the node coupled to the current source and having a second branch coupled to the output of said rectifier.

According to an embodiment, constant K2 is greater than 10, preferably in the range from 50 to 200.

According to an embodiment, the processing unit is capable of providing a signal for enabling or disabling the current regulation circuit.

According to an embodiment, the enable signal activates the current regulation circuit during phases where the contactless card prepares a response signal.

According to an embodiment, the current source is controlled proportionally to the power received by the antenna.

According to an embodiment, said current source comprises an impedance regulation circuit, coupled to the output of the rectifier and to the two ends of said antenna, the impedance regulation circuit being capable of limiting the output voltage of the rectifier; and a current generation circuit configured to be controlled by the impedance regulation circuit.

According to an embodiment, the impedance regulation circuit comprises a first and a second N-channel MOS transistors capable of absorbing a current related to the power received by the antenna, having their gates coupled together and having their drains coupled to the ends of said antenna; the current generation circuit comprises a third N-channel MOS transistor having its gate coupled to the gates of the first and second transistors; and the current generation circuit also comprises a fourth current mirror having a first branch coupled to the drain of the third transistor, and having a second branch supplying the current of said current source.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1A:
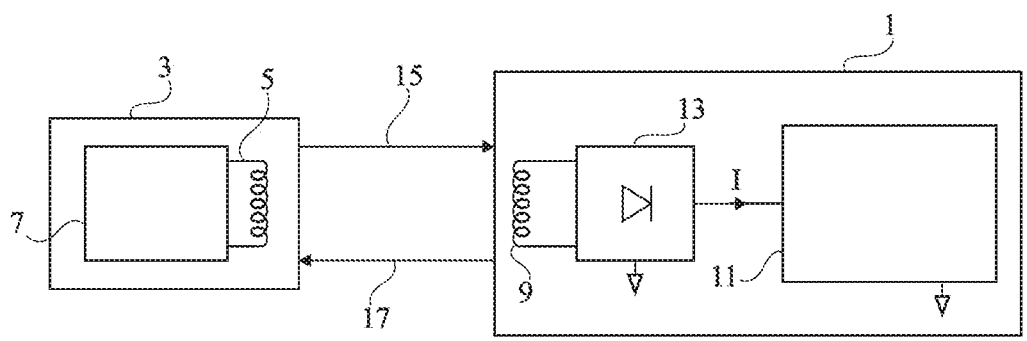
FIG. 1A, previously described, shows a remotely powered contactless card arranged in the vicinity of a terminal.

The same elements have been designated with the same reference numerals in the different drawings. For clarity, only those elements which are useful to the understanding of the described embodiments have been shown and are detailed.

Figure 2A:
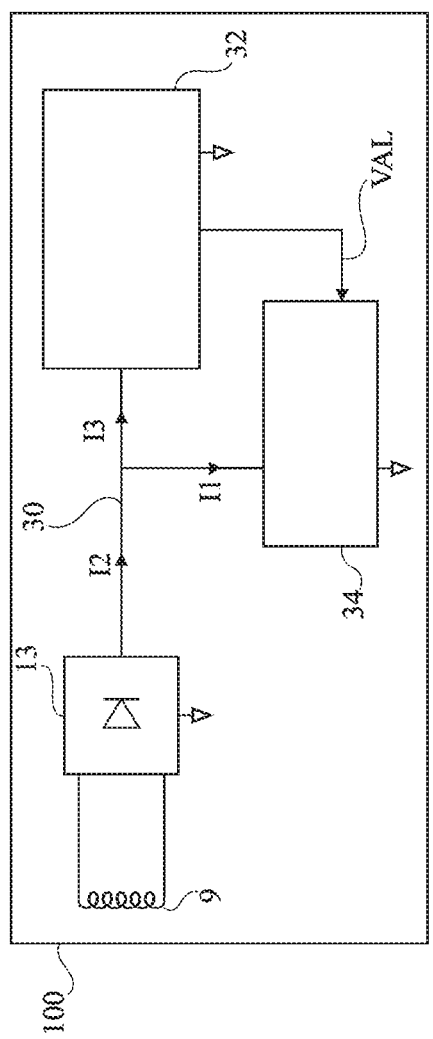
FIG. 2A is a simplified representation of an embodiment of a remotely powered contactless card.

FIG. 2A is a simplified representation of an embodiment of a remotely powered contactless card 100. An antenna 9 is coupled to the input of a rectifier 13. The output of rectifier 13 is coupled by a conductor 30 to a data processing unit 32 coupled to the card ground. A circuit 34 is coupled to the card ground, to conductor 30, and to data processing circuit 32.

Circuit 34 is a current regulation circuit capable of sampling a regulation current I1 from conductor 30, so that current I2 supplied by the rectifier, which is the sum of current I1 and of current I3 consumed by the data processing circuit, is constant during above-mentioned phase P2.

Figure 1B:
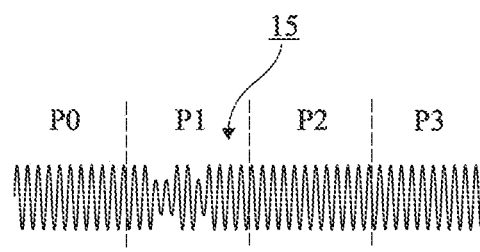
FIGS. 1B and 1C, previously described, show signals exchanged between the card and the terminal of FIG. 1A.
Figure 1C:
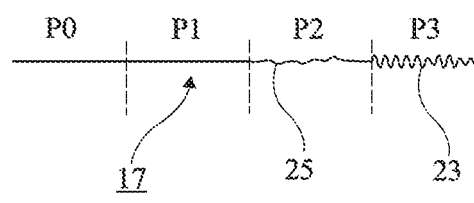

Circuit 34 may be activated or deactivated by a signal VAL originating from data processing unit 32. When the card, which has its circuit 34 initially deactivated, is in the vicinity of a terminal, phases P0 to P3 described in relation with FIG. 1B are successively carried out. Circuit 34 remains deactivated during initial phase P0 and during phase P1 of reception by the card.

When phase P1 is over, unit 32 activates current regulation circuit 34, which remains active during data processing phase P2. Thus, during phase P2, the current supplied by rectifier 13 is constant, the amplitude of the current induced by antenna 9 remains constant, and no impedance variation can be detected by the terminal. Antenna 9 then transmits no signal.

Unit 32 deactivates circuit 34 again during phase P3 of response of the card to the terminal.

Figure 2B:
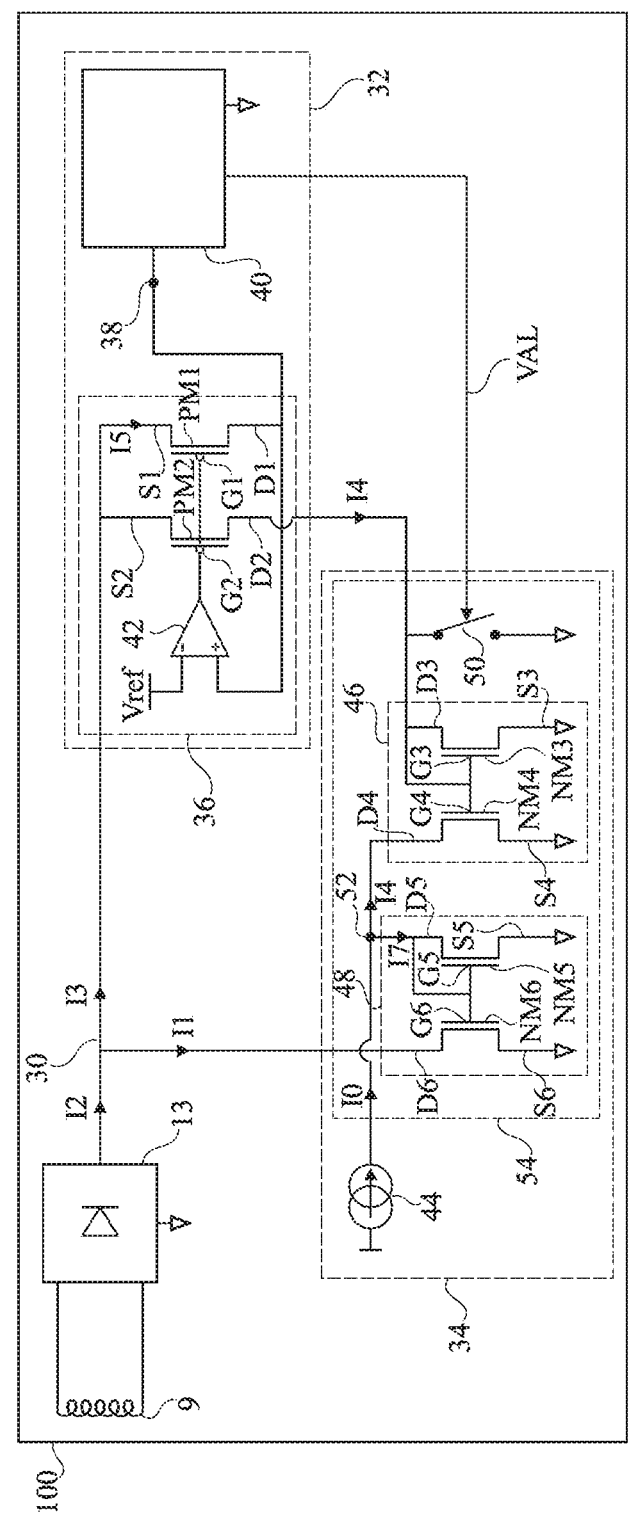
FIG. 2B shows an example of an electric circuit implementing the embodiment of FIG. 2A.

FIG. 2B shows an example of electric circuit implementing an embodiment of the card of FIG. 2A.

Data processing unit 32 comprises a voltage regulator 36 coupled between conductor 30 and input terminal 38 of a processing circuit 40.

Voltage regulator 36 comprises an operational amplifier 42 having its inverting input coupled to a reference voltage Vref and having its non-inverting input coupled to terminal 38. The output of amplifier 42 is coupled to gate G1 of a P-channel MOS transistor PM1 which has its source S1 connected to conductor 30 and its drain D1 connected to terminal 38. In operation, the voltage regulator ascertains that the voltage on input terminal 38 of the processing circuit remains equal to Vref.

A P-channel MOS transistor PM2 is assembled as a current mirror with transistor PM1. Source S2 and gate G2 of transistor PM2 are respectively connected to source S1 and to gate G1. In operation, the ratio of current I5 flowing through transistor PM1 to current I4 flowing through transistor PM2 is constant and equal to a value K1 greater than 10, preferably in the range from 50 to 200, to decrease the power consumption.

In operation, current I3 consumed by unit 32 is the sum of currents I5 and I4, and thus current I4 is equal to I3/K2, where K2 is a constant equal to K1+1.

Current regulation circuit 34 comprises a current source 44, two current mirrors 46 and 48, and a controlled switch 50. Current source 44 supplies a constant current I0 and is connected to a terminal 52. The assembly of the two current mirrors 46 and 48 and of controlled switch 50 is designated with reference numeral 54.

Current mirror 46 comprises two identical N-channel MOS transistors NM3 and NM4 which have their sources S3 and S4 connected to the card ground. Gates G3 and G4 of transistors NM3 and NM4 are connected together, to drain D3 of transistor NM3, and to drain D2 of transistor PM2. Drain D4 of transistor NM4 is connected to terminal 52. In operation, the currents flowing through the two transistors NM3 and NM4 have the same intensity.

Current mirror 48 comprises two identical N-channel MOS transistors NM5 and NM6 having their sources S5 and S6 connected to the card ground. Gates G5 and G6 of transistors NM5 and NM6 are connected together, to drain D5 of transistor NM5, and to terminal 52. Drain D6 of transistor NM6 is connected to conductor 30. In operation, the ratio of regulation current I1 flowing through transistor NM6 to current I7 flowing through transistor NM5 is constant and equal to above-mentioned value K2.

Switch 50 is controlled by signal VAL. This switch is, in this example, arranged between drain D3 of transistor NM3 and the card ground.

When the activation of circuit 34 is controlled by signal VAL, switch 50 is turned off and current I4 flows through transistor NM3. By the action of current mirror 46, a current of intensity I4 is sampled from current I0 supplied by source 44. Current I7 which flows through transistor NM5 is such that I7=I0−I3/K2. Thus, by the action of current mirror 48, I1=K2*I7=K2*I0−I3, and thus I2=K2*I0, that is, output current I2 of the rectifier is constant and equal to constant current I0 of current source 44, multiplied by a constant factor, K2.

When signal VAL deactivate it, current regulation circuit 34 absorbs a constant current I1 equal to K2*I0 and the variations of current I2 at the output of rectifier 13 are related to the variations of current I3.

In the embodiment described in relation with FIG. 2B, if current I0 is set so that the regulation circuit operates properly when the card is close to the terminal, this results in that, when the card is far from the terminal, the power consumed by current regulation circuit 34 limits the power available for data processing unit 32. Accordingly, the limiting distance between the terminal and the card so that the card can operate is decreased.

Figure 3:
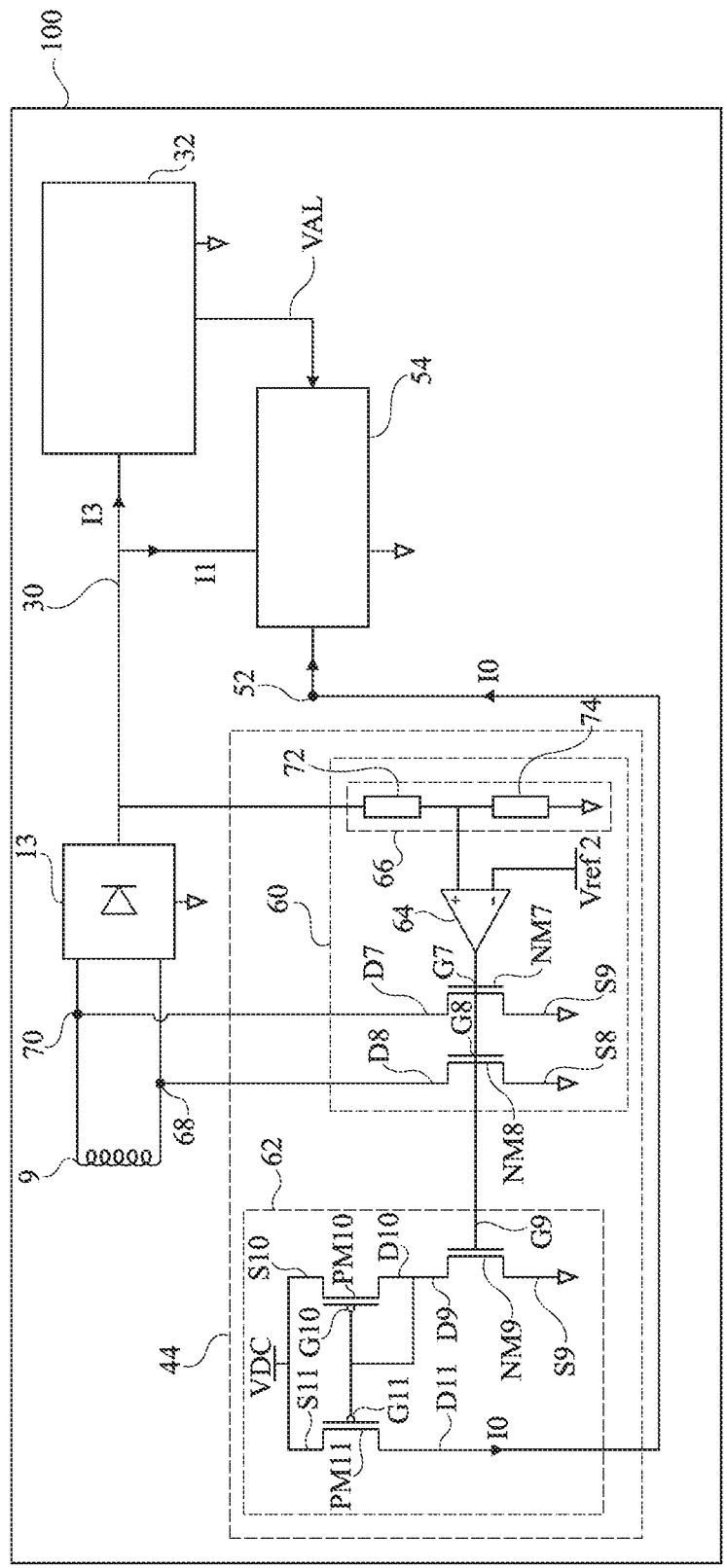
FIG. 3 is a simplified representation of another embodiment of a contactless card.

FIG. 3 is a simplified representation of another embodiment of a contactless card. In this embodiment, the current source of the current regulation circuit is controlled to a value related to the power received by contactless card 100.

FIG. 3 illustrates in detail an embodiment of current source 44. This drawing shows elements of FIG. 2B which will not be described again.

Current source 44 comprises an impedance regulation circuit 60 and a controlled current source 62.

Impedance regulation circuit 60 comprises an operational amplifier 64 having its inverting input coupled to a voltage reference Vref2. The non-inverting input of amplifier 64 is connected to a voltage divider 66. The amplifier output is connected to gates G7 and G8 of two identical N-channel MOS transistors NM7 and NM8. Sources S7 and S8 of transistors NM7 and NM8 are connected to the card ground. Drain D7 of transistor NM7 is connected to one of the ends, 70, of the antenna, and drain D8 of transistor NM8 is connected to the other end, 68, of the antenna.

Voltage divider 66 comprises two resistors 72 and 74 connected to the non-inverting input of amplifier 64. Resistor 74 is grounded and resistor 72 is connected to the output of rectifier 13.

In operation, impedance regulation circuit 60 imposes for the output voltage of the regulator to remain equal to constant voltage Vref2 multiplied by a constant defined by resistors 72 and 74. Circuit 60 avoids for the power received by the rectifier to be excessive and for too high voltages to appear. To achieve this, according to the power received by the antenna, circuit 60 deviates part of the current induced in the antenna towards ground via transistors NM8 and NM7.

Controlled current source 62 comprises an N-channel MOS transistor NM9, which forms a current mirror with transistors NM7 and NM8. Gate G9 of transistor NM9 is connected to gates G7 and G8 and its source S9 is grounded. In operation, the ratio of the current flowing through transistor NM9 to the current flowing through transistors NM7 and NM8 is equal to a constant defined by the transistor surface areas.

Controlled current source 62 also comprises two identical P-channel MOS transistors PM10 and PM11 assembled as a current mirror. Drain D10 of transistor PM10 is connected to drain D9 of transistor NM9. Sources S10 and S11 of transistors PM10 and PM11 are connected to a voltage source VDC, and their gates G10 and G11 are connected to each other and to drain D10.

When the card is powered, current I0, originating from voltage source VDC and flowing through transistor PM11, is identical to the current which flows through transistors PM10 and NM9. Current I0 is thus proportional to the currents, which are a function of the received power, flowing through transistors NM7 and NM8 of the impedance regulation circuit. Thus, current I0 is high when the received power is high, and low when the received power is low.

Specific embodiments have been described. Various alterations, modifications, and improvements will occur to those skilled in the art. In particular, it should be clear to those skilled in the art that switch 50, enabling to activate and to deactivate current regulation circuit 34, may be placed at other locations in the circuit. As a non-limiting example, switch 50 may be placed between the output of current source 44 and the ground. Signal VAL may also directly activate and deactivate the current source.

Although the described electric circuits use MOS-type transistors, it should be clear to those skilled in the art that it is possible to partly or totally replace the MOS transistors with bipolar transistors.

Although the ratios of the described current mirrors 46 and 48 of current regulation circuit 34 are respectively equal to 1 and to K2, it should be clear to those skilled in the art that it is possible to select other combinations of current mirror with ratios having a product K2.

Although current I4, equal to the input current of the data processing circuit divided by constant K2 and used by current regulation circuit 34 is obtained by a current mirror arranged on a voltage regulator based on P-type MOS transistors, other embodiments will occur to those skilled in the art to create this current. As a non-limiting example, current I4 may be created from a voltage regulator based on N-channel MOS transistors, or in the form of a current mirror independent from the voltage regulation.

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

The invention claimed is:

1. A circuit, comprising:
    a voltage regulator having a first transistor with a supply input coupled to receive an input voltage and a supply output configured to provide a regulated voltage;
    a current sensing transistor coupled in parallel with the first transistor and having an output configured to provide a first current indicative of current flowing through the first transistor;
    a first current mirror circuit having an input configured to receive said first current and an output configured to generate a second current; and
    a second current mirror circuit having an output configured to generate a third current applied to said supply input and further having an input configured to receive said second current and a fourth current from a current source.

2. The circuit of claim 1, wherein said voltage regulator further comprises an amplifier having an output coupled to control terminals of the first transistor and current sensing transistor.

3. The circuit of claim 1, wherein the first current mirror comprises:
    a second transistor in a diode-connected configuration connected to receive the first current; and
    a third transistor having a control terminal coupled to the control terminal of the second transistor and configured to generate said second current.

4. The circuit of claim 1, wherein the second current mirror comprises:
    a fourth transistor in a diode-connected configuration connected to receive the second current and fourth current; and
    a fifth transistor having a control terminal coupled to the control terminal of the fourth transistor and configured to generate said third current.

5. The circuit of claim 1, said current source comprising:
    a sixth transistor coupled between a first input of the rectifier circuit and a reference node;
    a seventh transistor coupled between a second input of the rectifier circuit and said reference node;
    wherein control terminals of the sixth and seventh transistors are connected together; and
    a current generator circuit having a control input coupled to the control terminals of the sixth and seventh transistors and an output generating said fourth current.

6. The circuit of claim 5, wherein the current source further comprises an amplifier having an input coupled to said output of the rectifier circuit and an output coupled to the control terminals of the sixth and seventh transistors and the control input of the current generator circuit.

7. The circuit of claim 1, wherein the input voltage is generated at an output of a rectifier circuit.

8. The circuit of claim 7, wherein inputs of said rectifier circuit are coupled to terminals of an antenna.

9. A circuit, comprising:
    a rectifier circuit having an output supplying a first current;
    a voltage regulator circuit powered from the first current and configured to generate a regulated voltage and supply current;
    a processing unit powered by the regulated voltage and supply current;
    a current sensor configured to sense said supply current and generate a sense current; and
    a current regulation circuit configured to apply a second current to the output of the rectifier circuit that is equal to a difference between a third current supplied by a current source and said sensed current.

10. The circuit of claim 9, wherein the current regulation circuit is selectively actuated by the processing unit during a time when said processing unit is performing data processing operations.

11. The circuit of claim 9, wherein said current source comprises:
    a first transistor coupled between a first input of the rectifier circuit and a reference node;
    a second transistor coupled between a second input of the rectifier circuit and said reference node;
    wherein control terminals of the first and second transistors are connected together;

a current generator circuit having a control input coupled to the control terminals of the first and second transistors and an output generating said third current; and an amplifier having an input coupled to said output of the rectifier circuit and an output coupled to the control terminals of the first and second transistors and the control input of the current generator circuit.

12. A circuit, comprising:

a processing unit configured to consume a first current;

a current regulation circuit configured to absorb a second current such that a sum of the first and second currents is a constant current;

a first current mirror configured to generate a third current equal to the first current divided by a constant;

a second current mirror having a first branch receiving the third current and having a second branch coupled to a node coupled to the current source; and a third current mirror having a first branch coupled to the node coupled to the current source and having a second branch coupled to the output of said rectifier.

13. The circuit of claim 12, wherein the constant current is set by a current source.

14. The circuit of claim 12, wherein the constant is greater than 10.

15. The circuit of claim 12, wherein the constant is in a range from 50 to 200.

16. The circuit of claim 12, wherein the processing unit is configured to generate a signal for enabling and disabling the current regulation circuit.

* * * * *